United States Patent [19]

Chemizard

[11] 4,206,796
[45] Jun. 10, 1980

[54] TIRE WITH SELF-SEALING INNER COATING

[75] Inventor: André Chemizard, Clermont-Ferrand, France

[73] Assignee: Compagnie Generale des Etablissements Michelin, Clermont-Ferrand, France

[21] Appl. No.: 884,232

[22] Filed: Mar. 7, 1978

[30] Foreign Application Priority Data

Mar. 8, 1977 [FR] France .................. 77 07038

[51] Int. Cl.² .......................... B60C 19/12
[52] U.S. Cl. .................. 152/347; 152/330 RF
[58] Field of Search ........... 152/330 L, 330 RF, 346, 152/347, 348

[56] References Cited

U.S. PATENT DOCUMENTS

| | | | |
|---|---|---|---|
| 2,161,490 | 6/1939 | Waber | 152/330 RF |
| 2,244,648 | 6/1941 | Carnahan | 152/347 X |
| 2,290,121 | 6/1942 | Tripp | 152/330 L |
| 2,877,819 | 3/1959 | Gibbs | 152/347 |

Primary Examiner—John P. Silverstrim
Assistant Examiner—D. W. Underwood
Attorney, Agent, or Firm—Brumbaugh, Graves, Donohue & Raymond

[57] ABSTRACT

A tire having a tread, sidewalls and an inner wall, said inner wall having, at least over the portion corresponding to the width of the tread, a layer of a self-sealing agent, a layer of elastomer arranged radially inward of the layer of self-sealing agent and partitions defining volumes of self-sealing agent arranged between said layer of elastomer and the inner wall of the tire is improved due to the fact that the transverse distances measured along the inner wall of the tire between successive partitions decrease from the tread in the direction towards the sidewalls of the tire.

8 Claims, 1 Drawing Figure

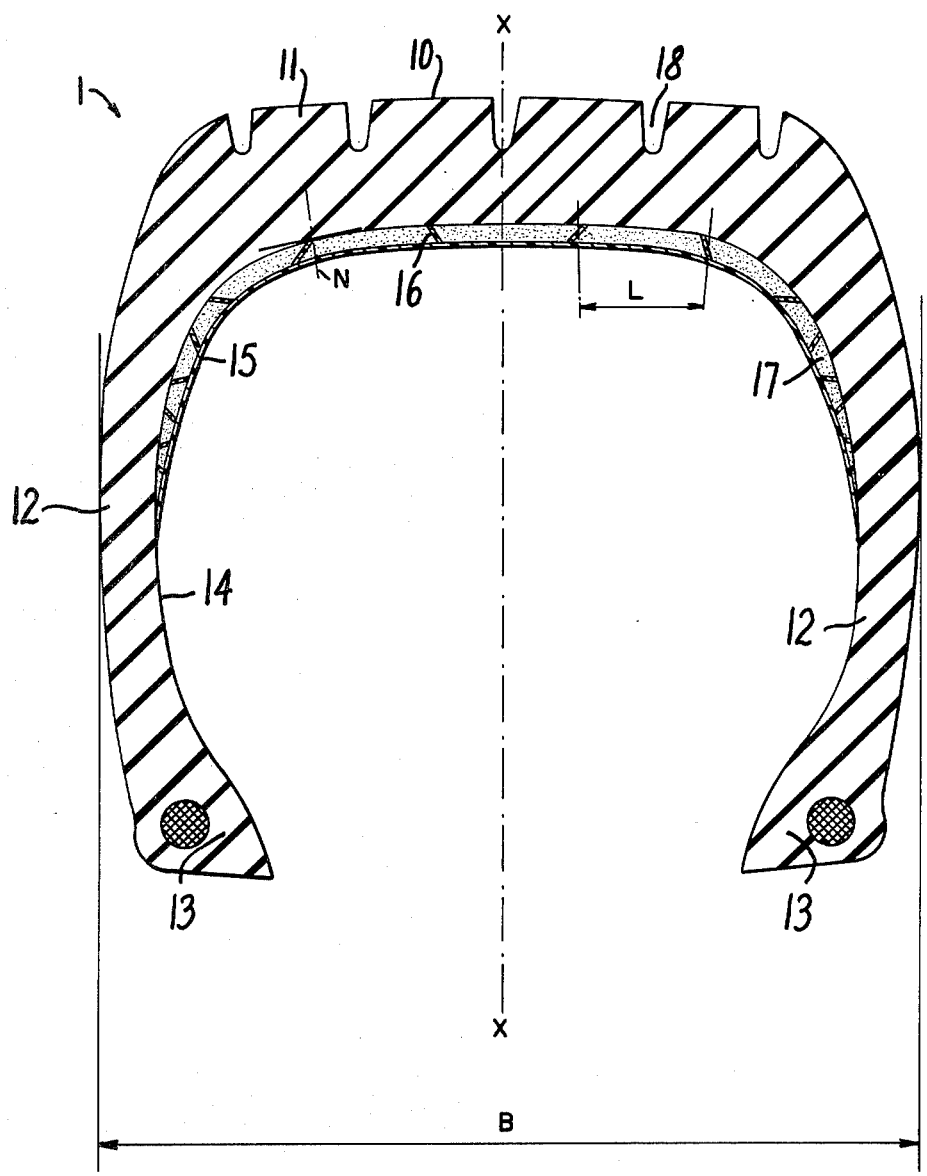

TIRE WITH SELF-SEALING INNER COATING

This invention relates to improvements in tires having a self-sealing inner coating.

It is known to use self-sealing substances arranged between a layer of elastomer and the inner wall of the tire and to prevent, by means of substantially equidistant circumferential and/or transverse partitions (which may be inclined or not with respect to the normal to the inner wall of the tire), the self-sealing substance from accumulating in the equatorial zone of the tire under the effect of centrifugal force, thus leaving the other zones of the tires vulnerable without protection against punctures.

Nevertheless, the layer of elastomer which covers the channels located on both sides of the tread tends to become deformed under the effect of the centrifugal force.

The thickness of the self-sealing substance, and therefore the activity thereof, becomes smaller in the sidewalls.

The object of the present invention is to overcome this drawback.

Accordingly, the tire of the invention having a tread, sidewalls and an inner wall, said inner wall having, at least over the portion corresponding to the width of the tread, a layer of a self-sealing agent, a layer of elastomer arranged radially inward of the layer of self-sealing agent and partitions defining volumes of self-sealing agent arranged between said layer of elastomer and the inner wall of the tire, is characterized by the fact that the transverse distances measured along the inner wall of the tire between successive partitions decrease from the tread in the direction towards the sidewalls of the tire.

In case use is made of partitions which are linear in radial cross section, the partitions may have an inclination advantageously of between 10° and 45° with respect to the normal to the inner wall of the tire.

The partitions are preferably arranged in circumferential direction and are linear in radial cross section.

By means of partitions in accordance with the invention, the partitioned volumes of self-sealing agent are less subject to the action of centrifugal force. It is advantageous to select the transverse distances between successive partitions (measured along the inner wall of the tire) between 6 and 20 times the thickness of the layer of the self-sealing agent in the equatorial zone of the tire and between 1 and 3 times the thickness of the layer of the self-sealing agent in the radially outer half of the sidewalls.

The thickness of the layer of the self-sealing agent, measured along a radial section and normal to the inner wall of the tire, is the distance between the inner wall of the tire and the layer of elastomer which separates the self-sealing agent from the cavity of the tire or the inner tube of the tire.

The invention is independent of the nature of the self-sealing agent, provided that the latter has, at the temperature of travel of the tire, suitable properties which permit its migration to the place of the puncture to be plugged.

In order to facilitate an understanding of the invention, the drawing and the description referring to said drawing give by way of illustration, but not of limitation, one example of an embodiment of the invention.

In said drawing, the sole FIGURE shows a tire in accordance with the invention in radial cross section.

In the radial cross section of the FIGURE there can be noted a tire 1 having a tread 10 extended on each side by a sidewall 12 which is terminated by a bead 13.

Between the inner wall 14 of the tire 1 and the layer of elastomer 15, whether or not reinforced, which is located radially inward of the inner wall 14, there are arranged linear partitions 16 which, in the example shown, are inclined with respect to the normal N to the inner wall 14 of the tire 1. The transverse width L of the volumes of self-sealing agent 17 decreases from the equatorial zone (indicated by the trace XX of the equatorial plane of the tire on the plane of the radial cross section) in the direction towards the portion of the sidewalls 12 where the tire 1 reaches its greatest axial width B. As can also be seen, the partitions 16 are arranged beneath relief elements of the tread 10, preferably beneath circumferential ribs 11 of the tread 10. Thus, nails which might penetrate through the grooves 18 would always finally reach a volume of self-sealing agent 17. As can also be seen, the inclination of successive partitions 16 alternates, but it may also be different and/or in the same direction from one partition 16 to the next partition 16. These partitions 16 may be reinforced, for instance, by a ply of fabric. The partitions 16 may also have a thickness between 5% and 60% of the thickness of the self-sealing agent 17.

For tires 1 for passenger cars of ordinary dimensions good results are obtained by having the transverse width L of the volumes of self-sealing agent 17 decrease such that they change from 20 mm to 30 mm below the tread 10 to 3 mm to 5 mm in the sidewalls 12 for a thickness of self-sealing agent 17 of about 3 mm.

What is claimed is:

1. A tire having a tread, sidewalls and an inner wall, said inner wall having, at least over the portion corresponding to the width of the tread, a layer of a self-sealing agent, a layer of elastomer arranged radially inward of the layer of self-sealing agent and partitions defining volumes of self-sealing agent arranged between said layer of elastomer and the inner wall of the tire, characterized by the fact that the transverse distances measured along the inner wall of the tire between successive circumferentially arranged partitions decrease from the tread in the direction towards the sidewalls of the tire.

2. A tire according to claim 1, characterized by the fact that the transverse distances between successive partitions are between 6 and 20 times the thickness of the layer of self-sealing agent in the equatorial zone of the tire and are between 1 and 3 times the thickness of the layer of self-sealing agent in the radially outer half of the sidewalls.

3. A tire according to claim 1, characterized by the fact that the partitions are linear in radial cross section.

4. A tire according to claim 3, characterized by the fact that the partitions have different inclinations with respect to the normal to the inner wall of the tire.

5. A tire according to claim 3, characterized by the fact that the partitions have an inclination of between 10° and 45° with respect to the normal to the inner wall of the tire.

6. A tire according to claim 1, characterized by the fact that the partitions have a thickness between 5% and 60% of the thickness of the self-sealing agent.

7. A tire according to claim 1, characterized by the fact that the partitions are arranged in circumferential direction.

8. A tire having a tread, sidewalls and an inner wall, said inner wall having, at least over the portion corresponding to the width of the tread, a layer of a self-sealing agent, a layer of elastomer arranged radially inward of the layer of self-sealing agent and partitions defining volumes of self-sealing agent arranged between said layer of elastomer and the inner wall of the tire, characterized by the fact that the transverse distances measured along the inner wall of the tire between successive circumferentially arranged partitions decrease from the tread in the direction towards the sidewalls of the tire, the partitions are arranged beneath relief elements of the tread, said relief elements being preferably circumferential ribs.

* * * * *